(12) United States Patent
Lee et al.

(10) Patent No.: US 8,124,285 B2
(45) Date of Patent: Feb. 28, 2012

(54) ELECTRODE HAVING SOLID ELECTROLYTE INTERFACE AND SECONDARY BATTERY USING THE SAME

(75) Inventors: Ho-Chun Lee, Daejeon (KR); Jeong-Ju Cho, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/043,722

(22) Filed: Mar. 9, 2011

(65) Prior Publication Data

US 2011/0159378 A1 Jun. 30, 2011

Related U.S. Application Data

(62) Division of application No. 12/310,489, filed as application No. PCT/KR2007/004054 on Aug. 24, 2007, now Pat. No. 7,972,733.

(30) Foreign Application Priority Data

Aug. 25, 2006 (KR) .................. 10-2006-0081297

(51) Int. Cl.
*H01M 6/04* (2006.01)
*H01M 4/60* (2006.01)

(52) U.S. Cl. ....................... 429/347; 429/212
(58) Field of Classification Search ................... None
See application file for complete search history.

(56) References Cited

U.S. PATENT DOCUMENTS 7,078,132 B2 7/2006 Kim et al.
7,592,095 B2 9/2009 Lee et al.

FOREIGN PATENT DOCUMENTS

| JP | 2000-331709 A | 11/2000 |
|---|---|---|
| JP | 14367672 A | 12/2002 |
| JP | 14367674 A | 12/2002 |
| JP | 17063772 A | 3/2005 |
| JP | 17222846 A | 8/2005 |
| JP | 18080008 A | 3/2006 |
| KR | 10-2004-0006058 A | 1/2004 |
| KR | 10-2004-0037154 A | 5/2004 |
| KR | 10-2008-0011693 A | 2/2008 |
| WO | 20061134653 A1 | 12/2006 |
| WO | 20071008006 A1 | 1/2007 |

OTHER PUBLICATIONS

SciFinder search history.*
Supplementary European Search Report, EP 07793657, dated Mar. 8, 2010.
International Search Report, PCT/KR2007/004054, dated Nov. 28, 2007.

* cited by examiner

*Primary Examiner* — Melvin Mayes
*Assistant Examiner* — Yun Qian
(74) *Attorney, Agent, or Firm* — Lerner, David, Littenberg, Krumholz & Mentlik, LLP

(57) ABSTRACT

Disclosed is an electrode having a solid electrolyte interface (SEI) film partially or totally formed on a surface thereof, the SEI film being formed by electrical reduction of a cyclic diester compound and a sulfinyl group-containing compound. Further, a secondary battery comprising the electrode is disclosed.

11 Claims, No Drawings

ELECTRODE HAVING SOLID ELECTROLYTE INTERFACE AND SECONDARY BATTERY USING THE SAME

CROSS REFERENCE TO RELATED APPLICATIONS

The present application is a divisional application of application Ser. No. 12/310,489 filed on Aug. 24, 2007 now issued U.S. Pat. No. 7,972,733, based on a national phase entry under 35 U.S.C. §371 of International Application No. PCT/KR2007/004054, filed Aug. 24, 2007, published in English, which claims the benefit of Korean Patent Application No. 10-2006-0081297, filed Aug. 25, 2006. The disclosures of said applications are incorporated by reference herein.

BACKGROUND OF THE INVENTION

Recently, there is an increasing interest in energy storage technology. Batteries have been widely used as energy sources in portable phones, camcorders, notebook computers, PCs and electric cars, resulting in intensive research and development into them. In this regard, electrochemical devices are subjects of great interest. Particularly, development of rechargeable secondary batteries is the focus of attention.

Among secondary batteries which are now in use, lithium secondary batteries developed in the early 1990s are in the spotlight due to the advantages of higher drive voltages and far greater energy densities than those of conventional batteries using an aqueous electrolyte, such as Ni-MH, Ni—Cd and $H_2SO_4$—Pb batteries.

A secondary battery includes a cathode, an anode, a separator, and an electrolyte comprising an electrolyte solvent and an electrolyte salt. Meanwhile, a conventional secondary battery comprising an anode formed of a carbonaceous material and a cathode formed of a lithium metal oxide has an average discharge voltage of 3.6~3.7V. To obtain such a drive voltage, it is necessary to provide an electrolyte composition that is stable in a charge/discharge voltage range of the battery, for example, in a range of 0 to 4.2V.

However, currently used electrolyte solvents have problems in that they are decomposed on the surface of an electrode during charge/discharge cycles of a battery, and are co-intercalated into a gap between carbonaceous anode active material layers to cause a structural collapse of the anode, resulting in degradation of the stability of the battery. Meanwhile, it has been known that the above problems could be solved by a solid electrolyte interface (SEI) film formed on the surface of an anode via the reduction of the electrolyte solvent upon the first charge cycle of the battery. However, the SEI film is not sufficient to serve as a lasting protective film for the anode. Therefore, the above problems still remain unsolved during repeated charge/discharge cycles, and may cause a drop in lifespan characteristics of the battery. Particularly, the SEI film is not thermally stable, and thus may be easily broken down by electrochemical energy and heat energy increasing with the lapse of time when the battery is driven or stored at high temperature. Accordingly, gases including $CO_2$ are generated continuously due to the collapse of the SEI film, decomposition of the electrolyte, etc., under such high temperature conditions, resulting in an increase in the internal pressure and thickness of the battery.

To solve the aforementioned problems, a method using vinylene carbonate (referred to also as VC hereinafter) as an electrolyte additive capable of forming a SEI film on an anode is suggested. However, the SEI film formed by VC is decomposed with ease when exposed under high temperature conditions, resulting in degradation of the high temperature stability of a battery.

SUMMARY OF THE INVENTION

Therefore, the present invention has been made in view of the above-mentioned problems. It is an aspect of the present invention to provide an electrolyte comprising both a cyclic diester compound and a sulfinyl group-containing compound in order to optimize the physical and thermal stability of an SEI film formed on the surface of an anode, to improve lifespan characteristics of a battery, and to ensure high-temperature stability of a battery.

The present invention provides an electrolyte comprising an electrolyte salt and an electrolyte solvent, the electrolyte further comprising both a cyclic diester compound and a sulfinyl group-containing compound. The present invention also provides a secondary battery comprising the same electrolyte.

Further, the present invention provides an electrode having a solid electrolyte interface (SEI) film partially or totally formed on a surface thereof, the SEI film being formed by electrical reduction of a cyclic diester compound and a sulfinyl group-containing compound. The present invention also provides a secondary battery comprising the same electrode.

Hereinafter, the present invention will be explained in more detail.

As described above, the SEI film formed on the surface of an anode by a conventional electrolyte composition is a physically weak film, and thus is easily broken down due to lithium intercalation/deintercalation during charge/discharge cycles of a battery. Also, the SEI film has low thermal stability, and thus may be thermally decomposed with ease, when the battery is stored or operated at high temperature, to cause generation of $CO_2$ or the like. As a result, the battery shows a swelling phenomenon including an increase in its thickness due to continuous gas generation under high temperature. This may lead to serious problems in various products using the battery, including mobile phones, notebook computers, etc.

There have been many attempts to add various electrolyte additives capable of forming SEI films to an electrolyte so as to improve stability of the SEI films. However, according to the prior art, it is not possible to improve the thermal stability and physical property of the SEI film at the same time.

Under these circumstances, according to the present invention, compounds having different thermal and physical stability characteristics, particularly a cyclic diester compound and a sulfinyl group-containing compound showing different densities in the resultant SEI films, are used in combination as electrolyte additives. By doing so, the present invention makes it possible to optimize physical stability and thermal stability of the SEI film formed on the surface of an anode. Such optimization of the battery quality may be explained as follows, but is not limited thereto.

The SEI film formed by a cyclic diester compound is firm but has low thermal stability, while the SEI film formed by a sulfinyl group-containing compound has excellent thermal stability but is a physically weak film.

Additionally, the cyclic diester compound forms a relatively dense SEI film, while the sulfinyl group-containing compound forms a relatively porous SEI film. Due to such different densities, when the above compounds are used in combination as additives for an electrolyte according to the present invention, an SEI film is formed by one component, and then an additional SEI film may be formed by the other component on a thin or porous portion of the first SEI film or on a portion of the surface of an anode having no SEI film. As a result, the SEI films, each formed by the above compounds, cooperate with each other to provide an SEI film having excellent thermal stability and physical stability at the same time. Particularly, the SEI film according to the present invention includes two different kinds of SEI films stacked successively, and thus can show excellent rigidity. Therefore, it is possible to minimize a drop in the capacity of a battery during repeated charge/discharge cycles, and to improve both lifespan characteristics and high-temperature stability of a battery at the same time.

The non-aqueous electrolyte according to the present invention comprises both a cyclic diester compound and a sulfinyl group-containing compound.

Herein, the cyclic diester compound and the sulfinyl group-containing compound preferably have the difference tolerance of 0 to 0.5V (more preferably 0~0.3V) in reduction potentials vs. Li+/Li. If the difference tolerance in reduction potentials vs. Li+/Li is too high, an SEI film is formed predominantly by any one component. Thus, it may be difficult to adequately control thermal stability and physical stability of the SEI film.

There is no particular limitation in the cyclic diester compound, as long as the compound contains two ester groups in its ring backbone. The cyclic diester compound may include a compound represented by the following Formula 1, and non-limiting examples thereof include glycolide, methyl glycolide, lactide, tetramethyl glycolide, fluoroglycolide, vinylglycolide, or the like.

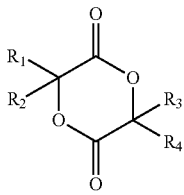

[Formula 1]

wherein each of $R_1$~$R_4$ independently represents a hydrogen atom, halogen atom, C1~C10 alkyl group, C2~C10 alkenyl group, or a halogen-substituted alkyl or alkenyl group.

Additionally, the sulfinyl (S=O) group-containing compound may include sulfone, sulfite, sulfonate and sultone (cyclic sulfonate), and the above compounds may be used alone or in combination. Herein, the sulfone compound may be represented by the following Formula 2 and includes divinyl sultone. The sulfite compound may be represented by the following Formula 3, and includes ethylene sulfite or propylene sulfite. The sulfonate compound may be represented by the following Formula 4 and includes diallyl sulfonate. Further, non-limiting examples of the sultone compound include propane sultone, butane sultone, propene sultone, or the like.

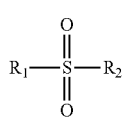

[Formula 2]

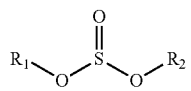

[Formula 3]

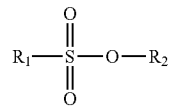

[Formula 4]

wherein each of $R_1$ and $R_2$ independently represents a hydrogen atom, halogen atom, C1~C10 alkyl group, C2~C10 alkenyl group, or a halogen-substituted alkyl or alkenyl group.

The cyclic diester compound and the sulfinyl group-containing compound may be used in a controlled amount as desired to improve the quality of a battery. Preferably, the cyclic diester compound is used in an amount of 0.1~10 parts by weight per 100 parts by weight of the electrolyte. If the cyclic diester compound is used in an amount of less than 0.1 parts by weight, it is not possible to improve lifespan characteristics of a battery sufficiently. If the cyclic diester compound is used in an amount of greater than 10 parts by weight, the amount of irreversible lithium required for forming the SEI film increases, resulting in a significant loss in the capacity of a battery. Additionally, the sulfinyl group-containing compound is used preferably in an amount of 0.5 5 parts by weight per 100 parts by weight of the electrolyte. If the sulfinyl group-containing compound is used in an amount of less than 0.5 parts by weight, it is not possible to improve high-temperature stability characteristics of a battery sufficiently. If the sulfinyl group-containing compound is used in an amount of greater than 5 parts by weight, the amount of irreversible lithium required for forming the SEI film increases, resulting in a significant loss in the capacity of a battery.

The electrolyte for a battery, to which the cyclic diester compound and the sulfinyl group-containing compound is added according to the present invention, further may comprise conventional components widely known to one skilled in the art, for example, an electrolyte salt and an electrolyte solvent.

The electrolyte salt that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_3^-$, $N(CF_3SO_2)_2^-$, $C(CF_2SO_2)_3^-$ and combinations thereof. A lithium salt is particularly preferred.

The electrolyte solvent that may be used in the present invention includes cyclic carbonates, linear carbonates, lactone, ether, ester, acetonitrile, lactam, ketone, or the like. Non-limiting examples of the cyclic carbonates include ethylene carbonate (EC), propylene carbonate (PC), butylene carbonate (BC), fluoroethylene carbonate (FEC), or the like. Non-limiting examples of the linear carbonates include diethyl carbonate (DEC), dimethyl carbonate (DMC), dipropyl carbonate (DPC), ethyl methyl carbonate (EMC), methyl propyl carbonate (MPC), or the like. Non-limiting examples of the lactone include gamma-butyrolactone (GBL), and Non-limiting examples of the ether include dibutyl ether, tetra hydro furan, 2-methyl tetra hydro furan, 1,4-dioxane, diethoxy ethane dimethoxy ethane, or the like. Non-limiting examples of the ester include methyl formate, ethyl formate, propyl formate, methyl acetate, ethyl acetate, propyl acetate, pentyl acetate, methyl propionate, ethyl propionate, propyl propionate, butyl propionate, methyl pivalate, or the like. Non-limiting examples of the ketone include poly methyl vinyl ketone. Halogen derivatives of the above electrolyte solvents may also be used. The above electrolyte solvents may used alone or in combination.

Additionally, the present invention provides an electrode (preferably an anode) having a solid electrolyte interface (SEI) film partially or totally formed on a surface thereof, the SEI film being formed by electrical reduction of a cyclic diester compound and a sulfinyl group-containing compound. The electrode can be obtained by subjecting to at least one charge/discharge cycle after assembling a unit cell using an electrode manufactured by a conventional method known to one skilled in the art and an electrolyte comprising the cyclic diester compound and the sulfinyl group-containing compound, so that a SEI film can be formed on the surface of the electrode active material. In a variant, before assembling a unit cell, an electrode manufactured by a conventional method known to one skilled in the art is subjected to electrical reduction while the electrode is dipped into an electrolyte comprising the cyclic diester compound and the sulfinyl group-containing compound, so as to obtain an electrode having a preliminarily formed SEI film thereon.

The electrode having no SEI film can be obtained by a conventional method known to one skilled in the art. In one embodiment of such conventional methods, electrode slurry is prepared by mixing and agitating an electrode active material and a solvent optionally with a binder, a conductive agent and a dispersant, and then the slurry is applied (coated) onto a metallic current collector, followed by compressing and drying.

Anode active materials may include any conventional anode active materials currently used in an anode of a conventional secondary battery. Particular non-limiting examples of the anode active material include lithium intercalation materials such as lithium metal, lithium alloys, carbon, petroleum coke, activated carbon, graphite or other carbonaceous materials. Non-limiting examples of an anode current collector include foil formed of copper, gold, nickel, copper alloys or a combination thereof.

Further, the secondary battery according to the present invention includes an electrolyte comprising both a cyclic diester compound and a sulfinyl group-containing compound, and/or an electrode having a solid electrolyte interface (SEI) film partially or totally formed on a surface thereof, the SEI film being formed by electrical reduction of a cyclic diester compound and a sulfinyl group-containing compound.

Preferably, the present invention provides a secondary battery comprising: a separator; a cathode; an anode having a SEI film partially or totally formed on a surface thereof, the SEI film being formed by electrical reduction of a cyclic diester compound and a sulfinyl group-containing compound; and/or an electrolyte comprising both a cyclic diester compound and a sulfinyl group-containing compound.

Preferably, the secondary battery is a lithium secondary battery, and non-limiting examples of the lithium secondary battery include a lithium metal secondary battery, a lithium ion secondary battery, a lithium polymer secondary battery or a lithium ion polymer secondary battery.

Particularly, cathode active materials may include any conventional cathode active materials currently used in a cathode of a conventional secondary battery. Particular non-limiting examples of the cathode active material include: lithium transition metal composite oxides, including $LiM_xO_y$ (wherein M=Co, Ni, Mn, $Co_aNi_bMn_c$), such as lithium manganese composite oxides (e.g. $LiMn_2O_4$), lithium nickel oxides (e.g. $LiNiO_2$), lithium cobalt oxides (e.g. $LiCoO_2$), or other oxides containing other transition metals partially substituting for manganese, nickel and cobalt; chalcogenide (e.g. manganese dioxide, titanium disulfide, molybdenum disulfide, etc.); or the like. Among these examples, $LiCoO_2$, $LiNiO_2$, $LiMnO_2$, $LiMn_2O_4$, $Li(Ni_aCo_bMn_c)O_2$ (wherein $0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ (wherein $0 \leqq Y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ (wherein $0<Z<2$), $LiCoPO_4$, $LiFePO_4$ or a mixture thereof is particularly preferred. Non-limiting examples of a cathode current collector include foil formed of aluminum, nickel or a combination thereof.

Preferably, the separator is a porous separator. Non-limiting examples of the separator that may be used include a polypropylene-based, polyethylene-based or polyolefin-based separator.

The secondary battery according to the present invention may be obtained by using a method generally known to one skilled in the art. For example, an electrode assembly is formed by using a cathode, an anode and a separator interposed between both electrodes, and then the above-described electrolyte is injected thereto.

There is no particular limitation in the outer shape of the secondary battery obtained in the above-described manner. The secondary battery may be a cylindrical, prismatic, pouch-type or coin-type battery.

DETAILED DESCRIPTION

Reference will now be made in detail to the preferred embodiments of the present invention. It is to be understood that the following examples are illustrative only and the present invention is not limited thereto.

Example 1

To 100 parts by weight of a solution containing 1M $LiPF_6$ in ethylene carbonate (EC) and diethyl carbonate (DEC) mixed in a weight ratio of 1:1, 2.0 parts by weight of glycolide (Formula 5) and 3.0 parts by weight of propane sultone were added to provide an electrolyte.

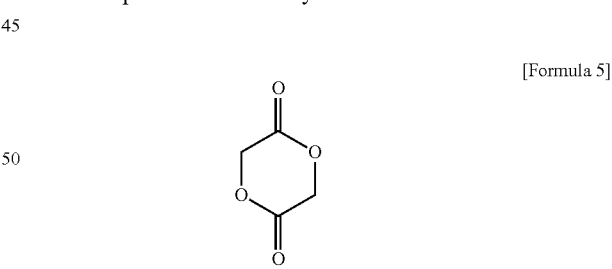

[Formula 5]

Example 2

An electrolyte was provided in the same manner as described in Example 1, except that ethylene sulfite was used instead of propane sultone.

Example 3

An electrolyte was provided in the same manner as described in Example 1, except that lactide (Formula 6) was used instead of glycolide.

[Formula 6]

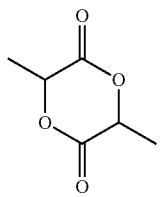

Comparative Example 1

An electrolyte was provided in the same manner as described in Example 1, except that glycolide was used alone.

Comparative Example 2

An electrolyte was provided in the same manner as described in Example 1, except that 2.0 parts by weight of lactide was used alone instead of glycolide and propane sultone.

Comparative Example 3

An electrolyte was provided in the same manner as described in Example 1, except that propane sultone was used alone.

Comparative Example 4

An electrolyte was provided in the same manner as described in Example 1, except that 3.0 parts by weight of ethylene sulfite was used alone instead of glycolide and propane sultone.

Comparative Example 5

An electrolyte was provided in the same manner as described in Example 1, except that no additive was added to the electrolyte.

Experimental Example 1

Measurement of Reduction Voltages of Electrolyte Additives

The following experiment was performed to measure reduction potentials of the cyclic diester compound and sulfinyl group-containing compound used in the present invention.

The electrolytes according to Comparative Examples 1~5 were used along with artificial graphite as a cathode and lithium foil as an anode to provide coin type half cells in the conventional manner. The coin type half cells were subjected to cyclic voltammetry in a range of 1.5V~1 mV at a scanning rate of 0.1 mV/sec in order to measure the peak reduction voltages. The results are shown in the following Table 1. For reference, it is to be noted that experimental results of reduction voltages obtained by using full cells under the same conditions are contrary to the following results.

TABLE 1

|  | Electrolyte Additive | Peak reduction voltage (V vs Li) |
|---|---|---|
| Comp. Ex. 1 | Glycolide 2 wt % | 1.1 |
| Comp. Ex. 2 | Lactide 2 wt % | 0.9 |
| Comp. Ex. 3 | Propane sultone 3 wt % | 1 |
| Comp. Ex. 4 | Ethylene sulfite 3 wt % | 1.2 |
| Comp. Ex. 5 | None | 0.6 |

After the experiment for the half cells, the electrolytes containing the cyclic diester compound or sulfinyl group-containing compound added thereto according to Comparative Examples 1~4 showed different reduction voltages as compared to the electrolyte containing no additive. This suggests that each of the voltages measured in Comparative Examples 1~4 means the reduction potential of each additive.

Particularly, the cyclic diester compound and the sulfinyl group-containing compound show higher reduction voltages as compared to the conventional electrolyte (Comparative Example 5). It can be estimated from the above results that the above compounds are reduced in advance of the electrolyte in a secondary battery, which is a full cell, to form an SEI film on the surface of an anode.

Experimental Example 2

Evaluation of Lifespan Characteristics of Lithium Secondary Batteries

The electrolytes according to Examples 1~3 and Comparative Examples 1~5 were used along with LiCoO$_2$ as a cathode and artificial graphite as an anode to provide coin type cells in the conventional manner. The coin type cells were subjected to 200 charge/discharge cycles at 0.5 C and the capacity maintenance of each cell was measured based on the initial capacity. The results are shown in the following Table 2.

Experimental Example 3

Evaluation of High-Temperature Stability of Lithium Secondary Batteries

The electrolytes according to Examples 1~3 and Comparative Examples 1~5, LiCoO$_2$ as a cathode and artificial graphite as an anode were used to provide aluminum pouch type bicells in the conventional manner. The cells were fully charged, stored at 90° C. for 6 hours, and then the increment in the thickness of each cell was measured. The results are shown in the following Table 2.

TABLE 2

|  | Electrolyte Additive | Capacity Maintenance (%) | Thickness increment (mm) |
|---|---|---|---|
| Ex. 1 | Glycolide 2 wt % Propane sultone 3 wt % | 82.1 | 0.2 |
| Ex. 2 | Glycolide 2 wt % Ethylene sulfite 3 wt % | 80.3 | 0.3 |
| Ex. 3 | Lactide 2 wt % Propane sultone 3 wt % | 80.5 | 0.1 |
| Comp. Ex. 1 | Glycolide 2 wt % | 62.1 | 1.2 |
| Comp. Ex. 2 | Lactide 2 wt % | 57.5 | 1.1 |
| Comp. Ex. 3 | Propane sultone 3 wt % | 49.3 | 0.4 |
| Comp. Ex. 4 | Ethylene sulfite 3 wt % | 52.6 | 0.3 |
| Comp. Ex. 5 | None | 43.3 | 1.4 |

After the experiment, the cells using the cyclic diester compound or the sulfinyl group-containing compound alone according to Comparative Examples 1~4 showed a slight increase (merely about 50~60%) in the discharge capacity maintenance as compared to the cell using no electrolyte additive according to Comparative Example 5. However, the cells using the cyclic diester compound in combination with the sulfinyl group-containing compound as electrolyte additives according to Examples 1~3 showed a capacity maintenance of 80% or higher. This demonstrates that the combination of a cyclic diester compound with a sulfinyl group-containing compound as electrolyte additives can significantly improve lifespan characteristics of a battery as compared to a battery using each compound alone.

Additionally, it could be seen from the experimental results that the cells of Examples 1~3 according to the present invention showed a significant drop in the thickness increment under high-temperature conditions as compared to the cell according to Comparative Example 5. This demonstrates that the combination of a cyclic diester compound with a sulfinyl group-containing compound as electrolyte additives can significantly improve lifespan characteristics of a battery and can ensure excellent high-temperature stability of a battery at the same time.

Experimental Example 4

Investigation of SEI Film Formation on Anode Via Reaction of Additive

The electrolytes according to Examples 1~3 and Comparative Examples 1~5 were used along with artificial graphite as a cathode and lithium foil as an anode were used to provide a coin type half cell in the conventional manner. Each of the coin type half cells was subjected to three times of charge/discharge cycles under 0.2 C at 23° C., each cell was disassembled in a discharged state, and then the anode was collected from each cell.

The anode was analyzed by DSC (differential scanning calorimetry) and the initial heat emission temperature was measured. The results are shown the following Table 3. It is generally thought that the initial heat emission is the result of the thermal degradation of the SEI film on the surface of the anode. Also, a higher initial heat emission temperature indicates that the SEI film formed on the surface of the anode has higher thermal stability.

TABLE 3

| | Electrolyte additive | Initial heat emission temperature (° C.) |
| --- | --- | --- |
| Ex. 1 | Glycolide 2 wt % Propane sultone 3 wt % | 125 |
| Ex. 2 | Glycolide 2 wt % Ethylene sulfite 3 wt % | 120 |
| Ex. 3 | Lactide 2 wt % Propane sultone 3 wt % | 128 |
| Comp. Ex. 1 | Glycolide 2 wt % | 103 |
| Comp. Ex. 2 | Lactide 2 wt % | 112 |
| Comp. Ex. 3 | Propane sultone 3 wt % | 123 |
| Comp. Ex. 4 | Ethylene sulfite 3 wt % | 119 |
| Comp. Ex. 5 | None | 107 |

After the experiment, the cells using a cyclic diester compound in combination with a sulfinyl group-containing compound as electrolyte additives according to Examples 1~3 and the cells using each of the above compounds alone according to Comparative Examples 1~5 showed different initial heat emission temperatures at the anodes. It can be seen from the above experimental results that the compounds used in the electrolyte according to the present invention, i.e. both the cyclic diester compound and the sulfinyl group-containing compound participate in the formation of the SEI films.

For reference, the cells of Examples 1~3 according to the present invention showed a initial heat emission temperature of 120° C. or higher. This demonstrates that the combination of the cyclic diester compound with the sulfinyl group-containing compound allows formation of an SEI film having excellent thermal stability.

INDUSTRIAL APPLICABILITY

As can be seen from the foregoing, the electrolyte according to the present invention can optimize thermal stability and physical stability of an SEI film formed on the surface of an anode, can improve lifespan characteristics of a battery, and can ensure high-temperature stability of a battery.

Although several preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. An electrode having a solid electrolyte interface (SEI) film partially or totally formed on a surface thereof, the SEI film being formed by electrical reduction of a cyclic diester compound and a sulfinyl group-containing compound, wherein the cyclic diester compound is not lactide.

2. The electrode as claimed in claim 1, wherein the cyclic diester compound is selected from the group consisting of glycolide, methyl glycolide, tetramethyl glycolide, fluoroglycolide and vinyl glycolide.

3. The electrode as claimed in claim 1, wherein the sulfinyl group-containing compound is selected from the group consisting of sulfone, sulfite, sulfonate and sultone.

4. The electrode as claimed in claim 1, wherein the sulfinyl group-containing compound is selected from the group consisting of divinyl sulfone, ethylene sulfite, propylene sulfite, diallyl sulfonate, propane sultone, butane sultone and propene sultone.

5. A secondary battery comprising a cathode, an anode and an electrolyte, wherein the electrolyte comprises an electrolyte salt and an electrolyte solvent, the electrolyte further comprising both a cyclic diester compound and a sulfinyl group-containing compound; and/or the cathode or the anode is the electrode having a solid electrolyte interface (SEI) film partially or totally formed on a surface thereof, the SEI film being formed by electrical reduction of a cyclic diester compound and a sulfinyl group-containing compound, wherein the cyclic diester compound is not lactide.

6. The secondary battery as claimed in claim 5, wherein the cyclic diester compound and the sulfinyl group-containing compound have the difference tolerance of 0 to 0.5V in reduction potentials vs. Li+/Li.

7. The secondary battery as claimed in claim 5, wherein the cyclic diester compound and the sulfinyl group-containing compound have the difference tolerance of 0 to 0.3V in reduction potentials vs. Li+/Li.

8. The secondary battery as claimed in claim 5, wherein the cyclic diester compound is represented by the following Formula 1:

[Formula 1]

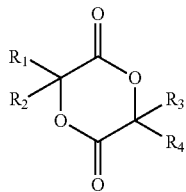

wherein each of $R_1$~$R_4$ independently represents a hydrogen atom, halogen atom, C1~C10 alkyl group, C2~C10 alkenyl group, or a halogen-substituted alkyl or alkenyl group, wherein the cyclic diester compound is not lactide.

9. The secondary battery as claimed in claim 5, wherein the cyclic diester compound is selected from the group consisting of glycolide, methyl glycolide, tetramethyl glycolide, fluoroglycolide and vinyl glycolide.

10. The secondary battery as claimed in claim 5, wherein the sulfinyl group-containing compound is selected from the group consisting of sultone, sulfite, sulfonate and sultone.

11. The secondary battery as claimed in claim 5, wherein the sulfinyl group-containing compound is selected from the group consisting of the compounds represented by the following Formula 2, Formula 3 and Formula 4:

[Formula 2]

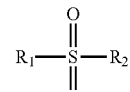

[Formula 3]

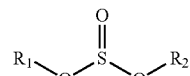

[Formula 4]

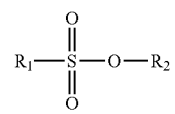

wherein each of $R_1$ and $R_2$ independently represents a hydrogen atom, halogen atom, C1~C10 alkyl group, C2~C10 alkenyl group, or a halogen-substituted alkyl or alkenyl group.

* * * * *